(No Model.)  5 Sheets—Sheet 1.

W. F. DURFEE.
MACHINE FOR CUTTING, PUNCHING, AND SWAGING.

No. 260,176.  Patented June 27, 1882.

WITNESSES.  INVENTOR.

(No Model.)

W. F. DURFEE.

MACHINE FOR CUTTING, PUNCHING, AND SWAGING.

No. 260,176. Patented June 27, 1882.

WITNESSES.
Albert R Lacey
George Terry

INVENTOR.
William F Durfee (No Model.)

5 Sheets—Sheet 4.

W. F. DURFEE.

MACHINE FOR CUTTING, PUNCHING, AND SWAGING.

No. 260,176. Patented June 27, 1882.

WITNESSES.
Albert R Lacey
George ...

INVENTOR.
William F Durfee (No Model.)  5 Sheets—Sheet 5.

W. F. DURFEE.
MACHINE FOR CUTTING, PUNCHING, AND SWAGING.
No. 260,176.  Patented June 27, 1882.

WITNESSES  INVENTOR
Albert R Lacey  William F Durfee

N. PETERS, Photo-Lithographer, Washington, D. C.

UNITED STATES PATENT OFFICE.

WILLIAM F. DURFEE, OF BRIDGEPORT, CONNECTICUT, ASSIGNOR TO THE WHEELER & WILSON MANUFACTURING COMPANY, OF SAME PLACE.

MACHINE FOR CUTTING, PUNCHING, AND SWAGING.

SPECIFICATION forming part of Letters Patent No. 260,176, dated June 27, 1882.

Application filed November 17, 1881. (No model.)

*To all whom it may concern:*

Be it known that I, WILLIAM F. DURFEE, a citizen of the United States, residing at Bridgeport, in the county of Fairfield and State of Connecticut, have invented certain new and useful Improvements in Machinery for Cutting or Forming Metals, of which the following is a specification, reference being made to the accompanying drawings for a better understanding of the same, in which—

Figure 1:
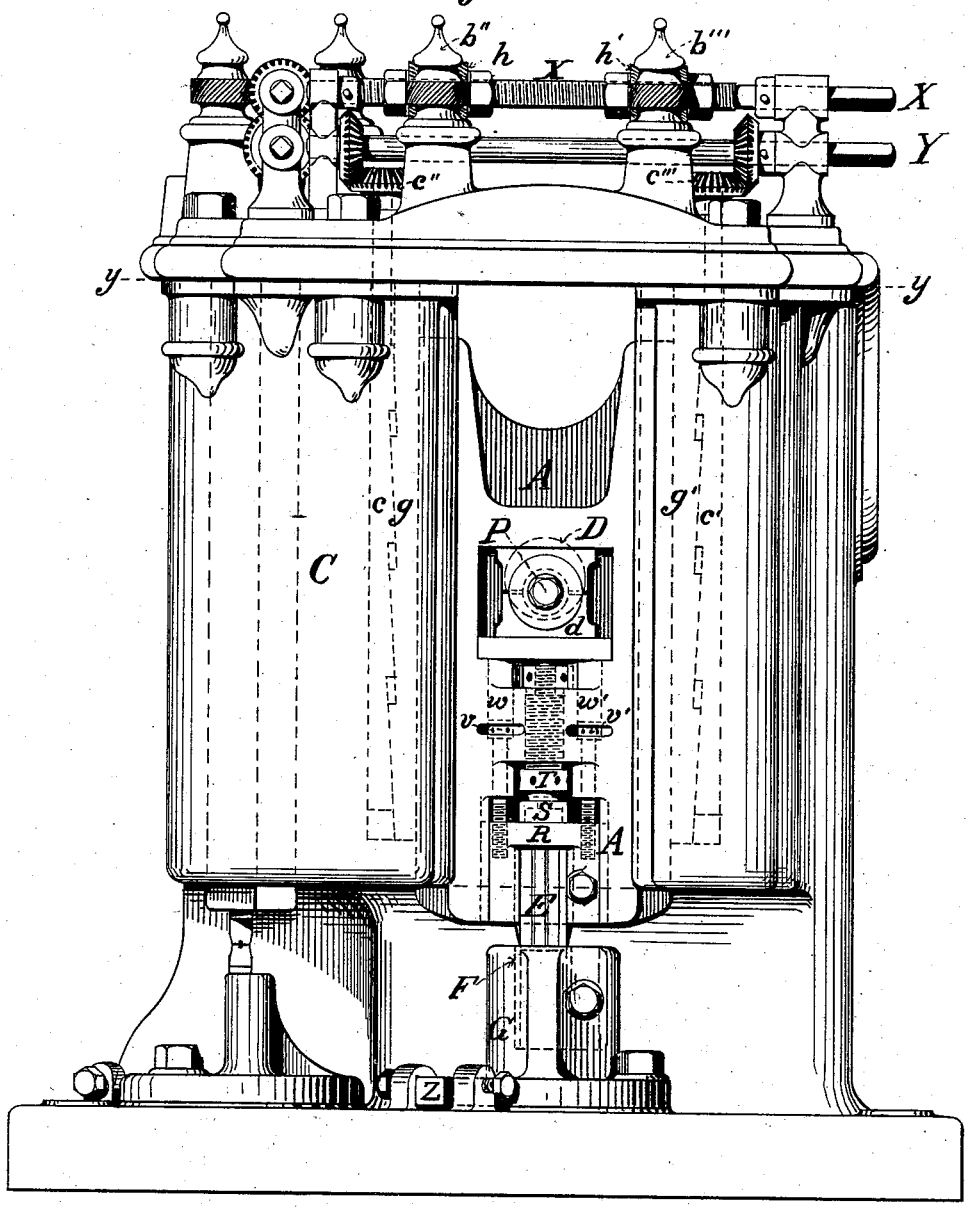
Figure 2:
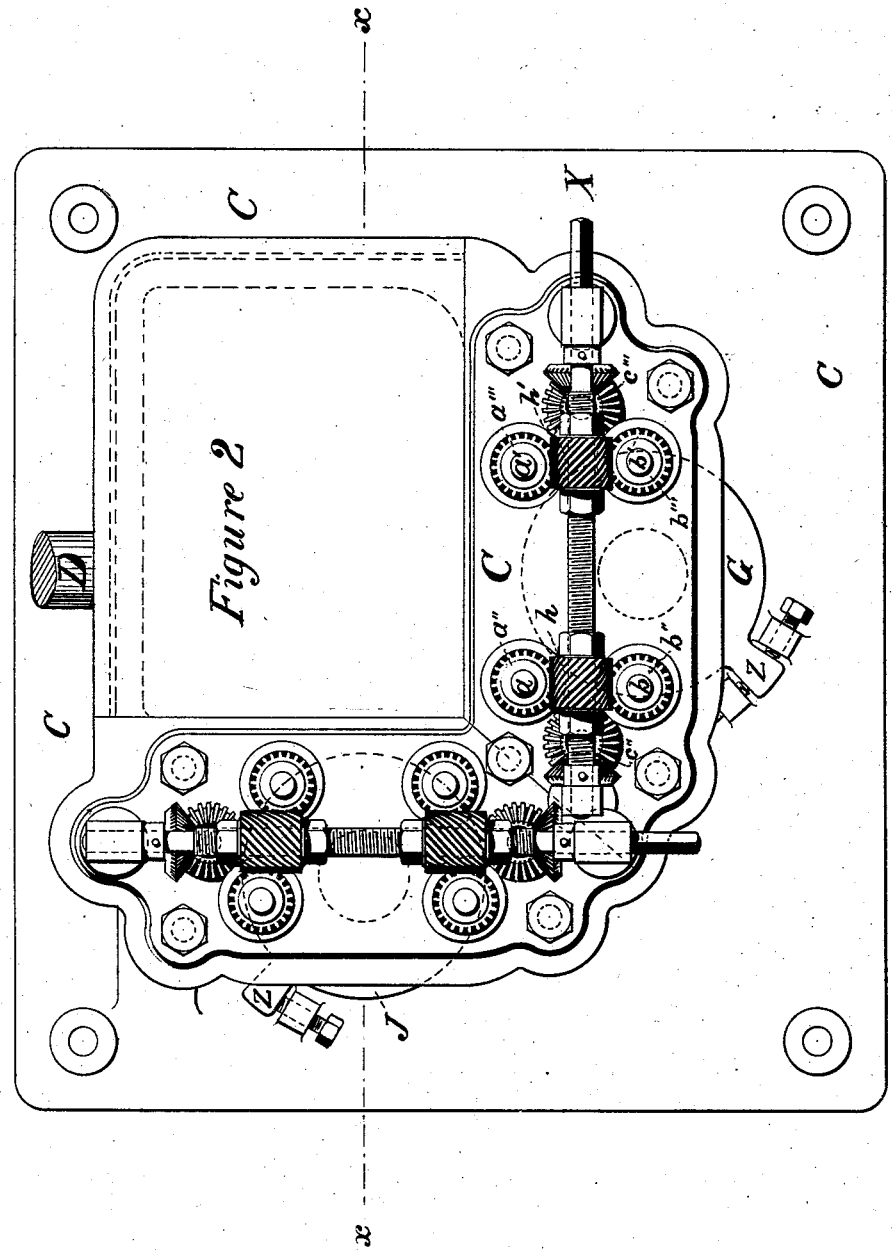
Figure 3:
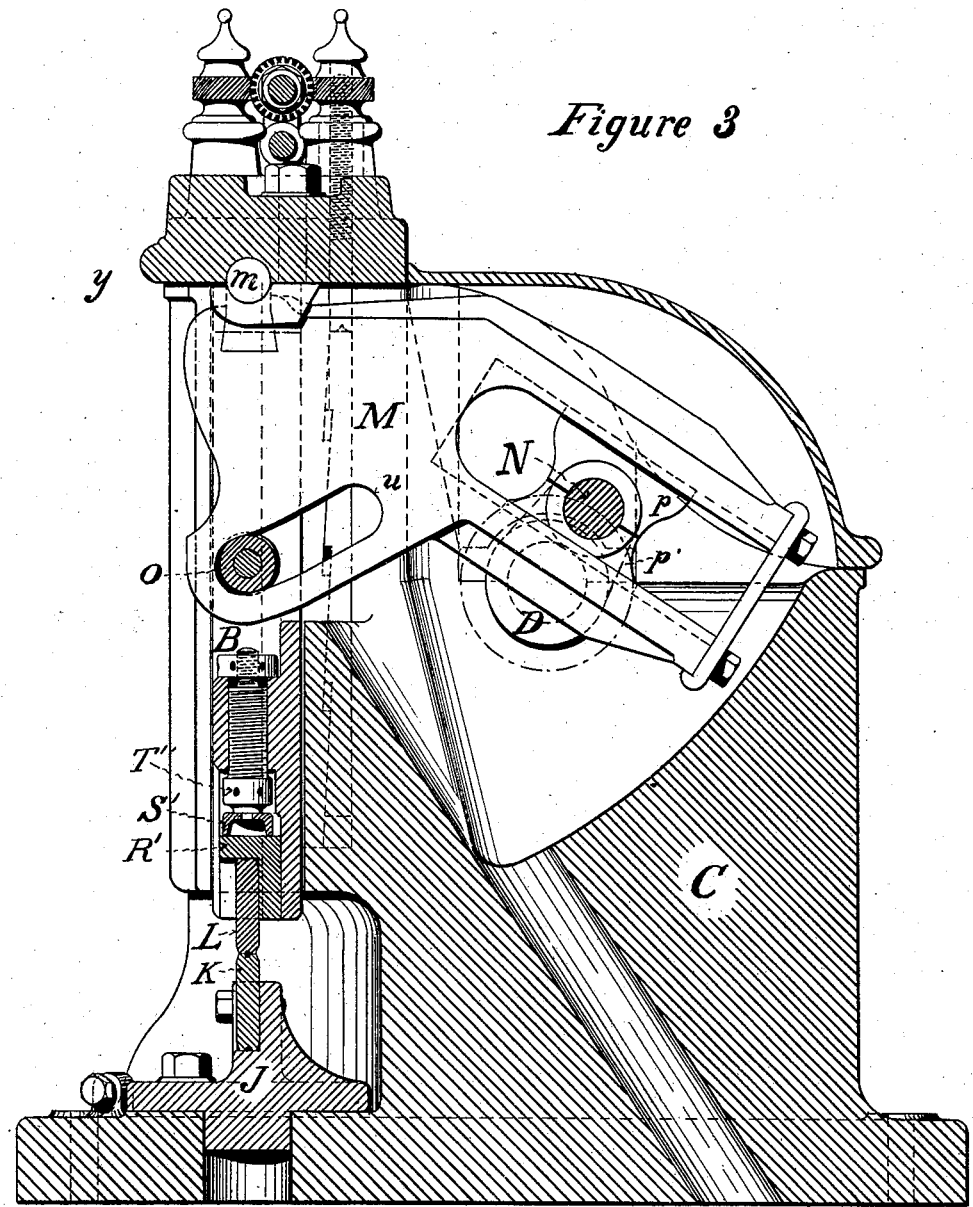
Figure 4:
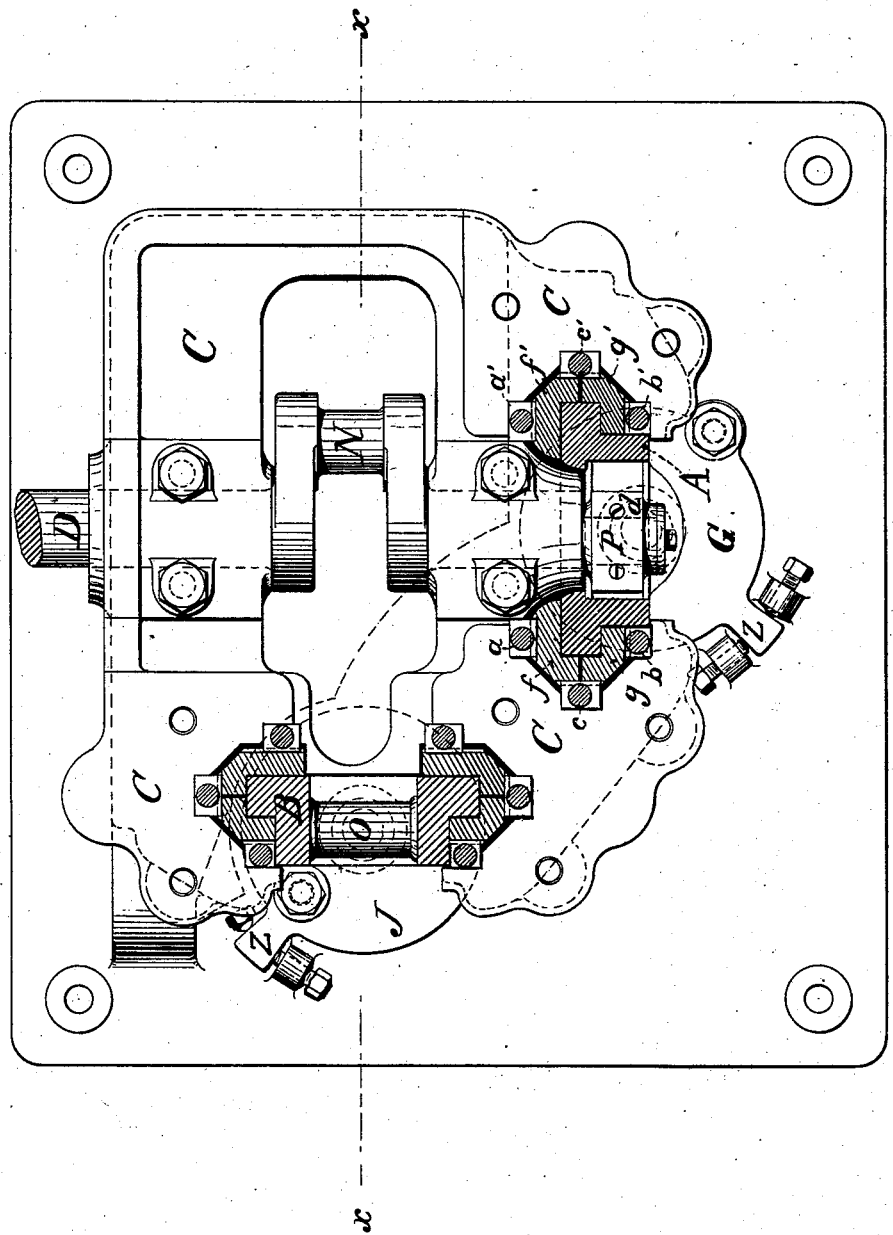
Figure 5:
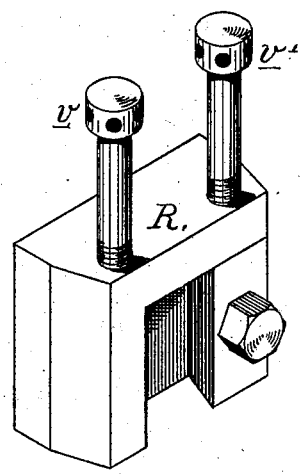
Figure 7:
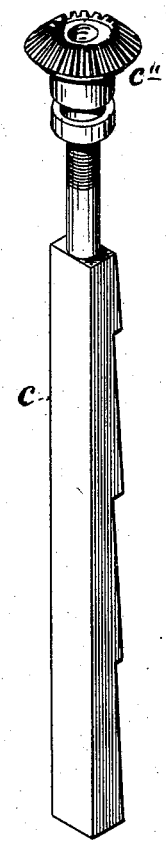
Figure 8:
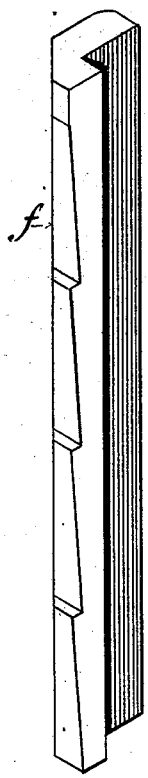
Figure 6:
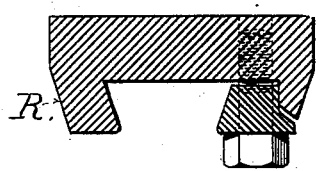
Figure 9:
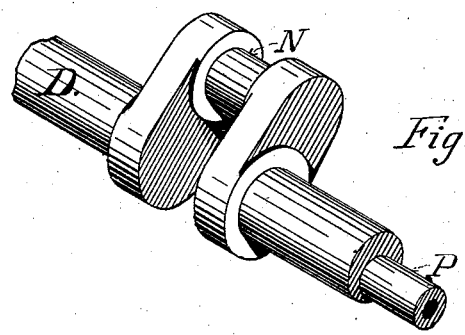

Figure 1 shows a front elevation of the machine, and Fig. 2 a plan view of the same. Fig. 3 is a sectional elevation taken on the lines $x\ x$ of Figs. 2 and 4. Fig. 4 represents a plan view, wherein all parts above the lines $y\ y$ of Figs. 1 and 3 are removed, and the press-gates A and B, together with their surrounding gibs, are shown in section. Fig. 5 represents in perspective one of the upper die-holding blocks detached, and Fig. 6 a horizontal section of the same, taken on the line $z\ z$. Fig. 7 is a perspective view of one of the several vertical adjusting-wedges, with a nut and its attached toothed wheel at its upper extremity. Fig. 8 represents detached one of the several gibs which surround the press-gates, and shows clearly the inclined faces thereon with which the corresponding inclined faces on the wedge, Fig. 7, engage. Fig. 9 illustrates in perspective the crank-shaft, with the two cranks thereon, for operating the two presses.

Similar letters of reference indicate like parts throughout the several views, C being the frame which sustains the various parts, and D a horizontal crank-shaft, which is arranged in suitable bearings in said frame, and which operates, by means of power applied thereto, to give the desired amount of vertical reciprocation to the press-gates A and B.

The manner in which the gates A and B aforesaid are operated isochronously is as follows: The shaft D, before mentioned, has at its extremity nearest to the gate A a projecting crank, P, (shown in Figs. 1, 4 and 9,) which, through the intervention of the sliding block $d$ working in an appropriate horizontal opening in the gate A aforesaid, operates to give a vertical reciprocating movement to the gate A. The shaft D has also the large crank, (see Figs. 3, 4, and 9,) the pin of which is incased in the sliding blocks $p\ p'$, and whose rotation causes the slotted extremity of the pendulous lever M to vibrate about the fulcrum $m$, from which said lever is suspended. (See Fig. 3.) The lever M has a cam-shaped slot, $u$, so located and formed that the movement of the lever will give, through contact with the roller O, attached to the gate B, (see Figs. 3 and 4,) a vertical reciprocating movement to the gate B, which shall be isochronous with that of the gate A, already described. The movement of the gate B need not of necessity be isochronous with that of the gate A, as by varying the form of the cam-shaped slot $u$ the relative movements of the gates may be varied also.

For the purpose of facilitating the adjustment and removal of the moving dies of either press, the following combinations of parts, or their equivalents, are employed: The vertical adjustment of said moving dies E and L is provided for by securing them in the blocks R and R', respectively, which blocks (see Figs. 5 and 6) are dovetailed into the lower end of the gates to which they belong, (see Figs. 1 and 3,) and are adjusted in a vertical direction by means of the pressure-screws T and T' and the screws $v\ v'$. These suspending-screws act to define and preserve the proper distance relation between the lower surface of the dies E and L and the center of the crank-pin P and roller O, respectively. Interposed between the said pressure-screws T and T' and the blocks R and R' are the cup-formed pieces of metal S and S', which are made of sufficient strength to resist the ordinary compression strain due to the work being performed; but when from any cause (such as the displacement of the piece of metal operated upon) the dies are subjected to an undue strain the cups S' and S' will break, thereby relieving the strain and preserving the dies. The original vertical position of the dies in their respective gates is restored by inserting another cup in place of the one broken, and then screwing down the pressure-screws T or T' solidly upon it until the lower side of the capstan-heads of the suspending-screws $v$ $v'$ come to their original solid bearings in the bottoms of the counterbores $w$ and $w'$.

In this connection attention is desired to the fact that it is immaterial whether the cup substituted is of the same vertical thickness as the one broken or not, for so long as the suspending-screws $v\ v'$ have not been turned the adjustment will be as originally made when their heads are in the position which they occupied before the cup aforesaid was broken.

The horizontal adjustments of the die E of the gate A are provided for by guiding said gate between the four adjustable gibs $f f'$ and $g g'$, each of which has inclined surfaces on its exterior sides, as shown in Figs. 1 and 8, which inclined surfaces engage with corresponding faces on the vertical adjusting-wedges $a\ a'$, $b\ b'$, and $c\ c'$, (see Figs. 1, 4, and 7,) each of said adjusting-wedges being fitted into vertical grooves in the frame C of the machine.

On the upper cylindrical ends of each of the adjusting-wedges $a\ a'$, $b\ b'$, and $c\ c'$ aforesaid is a screw-thread, on which are screwed the nuts $a''\ a'''$, $b''\ b'''$, and $c''\ c'''$, respectively, those on the ends of the wedges $a\ a'$ and $b\ b'$ having teeth cut spirally on their periphery, thereby forming "spiral gears," while those on the ends of the wedges $c\ c'$ (see Fig. 1) are cut in the form of "miter-gears," as shown in Fig. 7.

Placed longitudinally between the four spirally-toothed nuts $a''\ a'''$ and $b''\ b'''$ is the shaft X, mounted in suitable bearings attached to the frame C, on which are secured the two spiral gears $h\ h'$, for the purpose of giving simultaneous motion to the four vertical adjusting-wedges $a\ a'$ and $b\ b'$ aforesaid. Below this shaft X is placed the shaft Y, which has two miter-gears attached for the purpose of imparting simultaneous motion to the vertical adjusting-wedges $c\ c'$, Figs. 1, 4, and 7.

The manner of adjusting this gate A is substantially as follows, to wit: If it is desired to move the gate A and its die E to or from the operator, the shaft X is revolved by means of a wrench or an equivalent applied to the squared extremity of said shaft, thereby imparting a rotary motion to the several nuts on the top of the wedges $a\ a'$ and $b\ b'$, which motion raises or lowers one pair, $a\ a'$, while it lowers or raises the other pair, $b\ b'$, which, as will be seen, will force the gibs $f f'$ and $g g'$, and therefore the gate itself, in the desired direction.

To move the gate A and die E to the right or left, the shaft Y, with its miter-gears, is revolved by its squared extremity, which action causes the nuts at the top of the adjusting-wedges $c$ and $c'$ to turn, thereby raising or lowering one wedge, $c$, while it lowers or raises the other, $c'$. (See Fig. 1.)

It will be noticed that by this method of adjustment the free vertical movement of the sliding gate A is unobstructed, and that, having been once set with the desired amount of freedom, it can be adjusted horizontally to a limited degree in any direction at will. Should it be necessary to compensate for the wear on either the gate A or its several gibs, any one or more of said gibs may be adjusted independent of the others by disconnecting the adjacent adjusting-wedge from the shafts X or Y, and after having made the adjustment satisfactory the wedge aforesaid may be again connected with its shaft.

It may be desirable at times to turn one die relative to the other about a vertical axis in order to bring their faces into exact position. To accomplish this result I have given a rotary adjustment to the lower die-holders, G and J, by means of screws or equivalent devices operating upon the projecting arms Z of said holders.

The details and manner of adjustments being substantially the same in both of the press-gates, the foregoing description is applicable to both.

Having thus fully described my invention, what I claim as new, and desire to secure by Letters Patent, is—

1. In a machine for cutting or forming metal, the combination, with the gates A B, of the shaft D, having cranks N P and the vibrating lever M, provided with cam-slot $u$, substantially as shown and described.

2. In a machine for cutting or forming metal, the combination, with a gate, of a series of gibs, $f f'\ g g'$, and wedges $a\ a'$, $b\ b'$, $c\ c'$, and means for operating the same, whereby the gate is adjusted, substantially as described.

3. In a machine for cutting or forming metal, the combination, with a gate, of the block R, die E, break-cup S, and the adjusting-screws T and $v$, substantially as shown and described.

In testimony whereof I affix my signature in presence of two witnesses.

WILLIAM F. DURFEE.

Witnesses:
ALBERT R. LACEY,
GEORGE TERRY.